(12) United States Patent
Moshrefi et al.

(10) Patent No.: US 9,195,779 B2
(45) Date of Patent: Nov. 24, 2015

(54) CROWD-SOURCED PROBLEM SOLVING

(75) Inventors: Afshin Moshrefi, Newburyport, MA (US); Azim Nasir, Foxboro, MA (US); Dongchen Wang, Concord, MA (US); Hong Xiao, Acton, MA (US); Graham David Sysko, Cambridge, MA (US); Bradford A. Jackvony, Wakefield, MA (US)

(73) Assignees: Verizon Patent and Licensing Inc., Basking Ridge, NJ (US); Cellco Partnership, Basking Ridge, NJ (US)

( * ) Notice: Subject to any disclaimer, the term of this patent is extended or adjusted under 35 U.S.C. 154(b) by 0 days.

(21) Appl. No.: 13/275,625

(22) Filed: Oct. 18, 2011

(65) Prior Publication Data

US 2013/0097179 A1    Apr. 18, 2013

(51) Int. Cl.
*G06F 17/30* (2006.01)

(52) U.S. Cl.
CPC .... *G06F 17/30994* (2013.01); *G06F 17/30867* (2013.01)

(58) Field of Classification Search
CPC ................. G06F 17/30864; G06F 17/30867; G06F 17/30675; G06F 17/30882
USPC .................................................. 707/723, 748
See application file for complete search history.

(56) References Cited

U.S. PATENT DOCUMENTS

| | | | | |
|---|---|---|---|---|
| 5,367,667 A * | 11/1994 | Wahlquist et al. | ............... | 714/32 |
| 6,230,287 B1 * | 5/2001 | Pinard et al. | ................... | 714/31 |
| 6,321,192 B1 * | 11/2001 | Houchin et al. | .................. | 704/9 |
| 7,565,414 B1 * | 7/2009 | Love | ............................ | 709/219 |
| 2004/0260534 A1 * | 12/2004 | Pak et al. | ........................ | 704/7 |
| 2006/0282412 A1 * | 12/2006 | Getchius | .......................... | 707/3 |
| 2008/0104195 A1 * | 5/2008 | Hawkins et al. | ............. | 709/217 |
| 2008/0147789 A1 * | 6/2008 | Wing et al. | ................... | 709/203 |
| 2008/0294423 A1 * | 11/2008 | Castellani et al. | ................ | 704/4 |
| 2010/0077008 A1 * | 3/2010 | Davis et al. | ................... | 707/797 |
| 2010/0199219 A1 * | 8/2010 | Poniatowski et al. | ......... | 715/825 |
| 2011/0087644 A1 * | 4/2011 | Frieden et al. | ................ | 707/706 |
| 2011/0117894 A1 * | 5/2011 | Roundtree et al. | ......... | 455/414.1 |
| 2011/0153612 A1 * | 6/2011 | Paul et al. | ..................... | 707/740 |
| 2011/0270771 A1 * | 11/2011 | Coursimault et al. | ........ | 705/304 |
| 2012/0130996 A1 * | 5/2012 | Risvik et al. | .................. | 707/723 |

* cited by examiner

*Primary Examiner* — Cam-Y Truong

(57) ABSTRACT

A device includes an input device configured to receive a plurality of user inputs including a predetermined user input. A display device is configured to display a graphical user interface. A memory device is configured to store device information. A help application is in communication with the input device, the display device, and the memory device and is configured to detect the predetermined user input and, in response, populate the graphical user interface with a list of selectable solutions associated with the device information in accordance with a performance rank associated with each solution.

20 Claims, 4 Drawing Sheets

CROWD-SOURCED PROBLEM SOLVING

BACKGROUND

Consumers desire the best return on value for the products they purchase. As new technology is incorporated into just released products, consumers are eager to learn how the new technology works so that the maximum benefits of the new technology can be realized. For example, upon purchase of a new product such as a mobile device, consumers want to be able to readily understand how the new or updated features of the device work.

DETAILED DESCRIPTION

An exemplary mobile device is configured to display a list of solutions particular to that mobile device. The illustrative mobile device includes an input device configured to receive a plurality of user inputs, including a predetermined user input. A display device is configured to display a graphical user interface. A memory device is configured to store device information. A help application is in communication with the input device, the display device, and the memory device and is configured to detect the predetermined user input and, in response, populate the graphical user interface with a list of selectable solutions associated with the device information in accordance with a performance rank associated with each solution.

The list of solutions may be provided to the mobile device from a remote server. The remote server may be configured to execute a process that includes receiving a query, which may include the device information, from the mobile device. The method may further include aggregating the list of solutions based upon the device information, assigning to each solution a performance rank based at least in part on the device information received at the remote server, and transmitting, over a communication network, the list of solutions and the performance rank associated with each solution from the remote server to the mobile device.

The system described herein may present a user with various solutions and answers associated to common questions with regard to features of mobile devices without the user having to speak with a customer service representative of the service provider, saving the user time. Since customer call centers can be expensive to maintain, the exemplary system may further reduce costs to the service provider.

The system may take many different forms and include multiple and/or alternate components and facilities. While examples are shown in the Figures, the illustrated components are not intended to be limiting. Indeed, additional or alternative components and/or implementations may be used.

Figure 1:
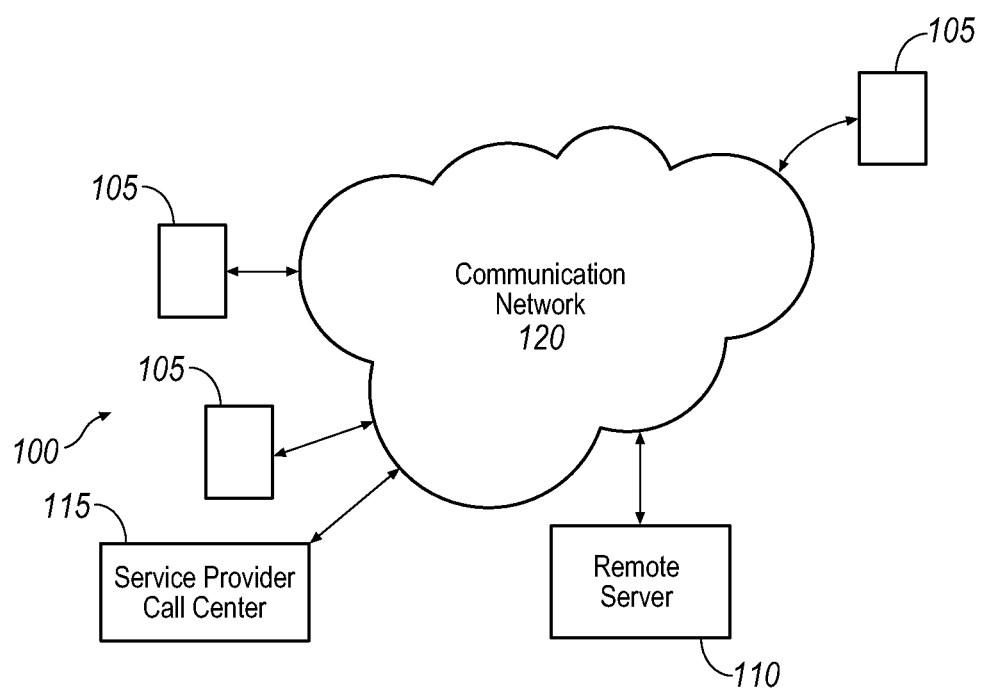
FIG. 1 illustrates an example system that includes mobile devices in communication with a remote server that can provide each mobile device with information specific to those devices.

FIG. 1 illustrates an example system 100 that may include a plurality of mobile devices 105, a remote server 110, and a service provider call center 115, each in communication with one another over a communication network 120.

Each mobile device 105 may include any combination of hardware and software configured to communicate over the communication network 120. In one possible approach, each mobile device 105 may be a subscriber device that is used to access one or more communication networks 120 managed by one or more service providers. For example, one or more mobile devices 105 may be configured to make and receive telephone calls and consume media content over a telecommunications or packet-switched network. The mobile devices 105 in the system 100 may include one or more of a cellular telephone, a set top box, a laptop, a desktop computer, a tablet computer, a digital camera, a music player, or the like.

Each mobile device 105 in the system 100 may be configured to store and execute one or more applications. The applications may control the way various features of the mobile device 105 operate. For instance, one application may control the way the mobile device 105 receives telephone calls while another application may control the way the mobile device 105 accesses and browses the internet. A different application may control the settings of the mobile device 105. The applications stored on the mobile device 105 may be configured to execute in response to an input from a user or automatically upon the occurrence of a predetermined event. For instance, one application may execute when selected by a user while another application may execute when the user dials a specific telephone number.

Each mobile device 105 may be further configured to store device information, which may define a characteristic of the mobile device 105. In one possible implementation, the device information may include a model name or model number of the mobile device 105. Alternatively or in addition, the device information may identify an operating system version or kernel version presently used by the mobile device 105. Moreover, the device information may identify the mobile device 105 using, e.g., a Mobile Equipment Identifier, an Electronic Serial Number, or an International Mobile Equipment Identifier. The mobile device 105 may be further configured to transmit the device information over the communication network 120.

A block diagram and graphical user interface of an example mobile device 105 is discussed in greater detail below with reference to FIGS. 2 and 3, and an example process that may be implemented by each mobile device 105 is discussed below with reference to FIG. 5.

The remote server 110 may include hardware, software, or any combination thereof able to communicate with one or more of the mobile devices 105 over the communication network 120. In one possible approach, the remote server 110 may be configured to receive the device information transmitted by the mobile device 105, process the device information received, and respond appropriately. The response from the remote server 110 may be received at the mobile device 105 and used by one or more applications stored on the mobile device 105. The remote server 110 may be configured to tailor the response to the mobile device 105 based on the device information received. For instance, if the device information identifies a particular model name, model number, and operating system version, the remote server 110 may transmit a response that is specific to mobile devices 105 with those characteristics as defined by the device information.

The remote server 110 may be configured to store data in one or more databases in a way that relates various characteristics that may be presented in the device information to the content of the response. This way, when the remote server 110 receives device information from one or more of the mobile devices 105, the remote server 110 may, using the device information, access the database to identify the appropriate response based on the data stored in a database. The remote server 110 may be configured to transmit unique responses to different types of mobile devices 105. One example process that may be implemented by the remote server 110 is discussed below with respect to FIG. 4.

In addition to transmitting unique responses for each type of mobile device 105 as defined by the device information, the remote server 110 may be further configured to dynamically update the content of the response based on various statistical data. The statistical data may include data received from one or more mobile devices 105 or from the service provider call center 115, discussed below. Additionally, each data point in the statistical data may be associated with a date so that the content of the response from the remote server 110 may be limited to a particular range. That is, the remote server 110 may be configured to identify the most common responses within a predetermined time period (e.g., the last week, month, year, or all-time) based on the data associated with each data point. This way, the unique responses transmitted to each mobile device 105 may include only the most popular responses within the predetermined time period. The predetermined time period may be designated by, e.g., the service provider or by a user of one or more of the mobile devices 105.

The service provider call center 115 may include a location where representatives of a service provider may receive and answer questions from the service provider's customers, some of whom may be users of one or more of the mobile devices 105 in the system 100. The representatives at the call center 115 may, for instance, receive and respond to questions from the customers using a telephone or computer (not shown), which may be configured to communicate over the communication network 120. As customers call the call center 115, each call may be routed to one of the representatives so that the representative may speak directly to the customer. Alternatively or in addition, electronic messages, such as emails, from the customers may be routed to one of the representatives so that the representative may respond electronically to the customer's question. Statistical data about the nature of customer questions and the mobile devices 105 associated with those questions may be sent from the call center 115 to the remote device.

The communication network 120 may include any telecommunication or computer network configured to enable communication among the mobile devices 105, the remote server 110, and the telephones or computers used by the representatives at the call center 115. The communication network 120 may include, therefore, a telecommunications network and a computer network.

In general, computing systems and/or devices, such as the mobile devices 105, the remote server 110, the telephones and computers used at the call center 115, etc., may employ any of a number of computer operating systems, including, but by no means limited to, versions and/or varieties of the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OS X and iOS operating systems distributed by Apple Inc. of Cupertino, Calif., the BlackBerry OS distributed by Research In Motion of Waterloo, Canada, and the Android operating system developed by the Open Handset Alliance. Examples of computing devices include, without limitation, a computer workstation, a server, a desktop, notebook, laptop, or handheld computer, or some other computing system and/or device.

Computing devices generally include computer-executable instructions, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, Visual Basic, Java Script, Perl, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

Figure 2:
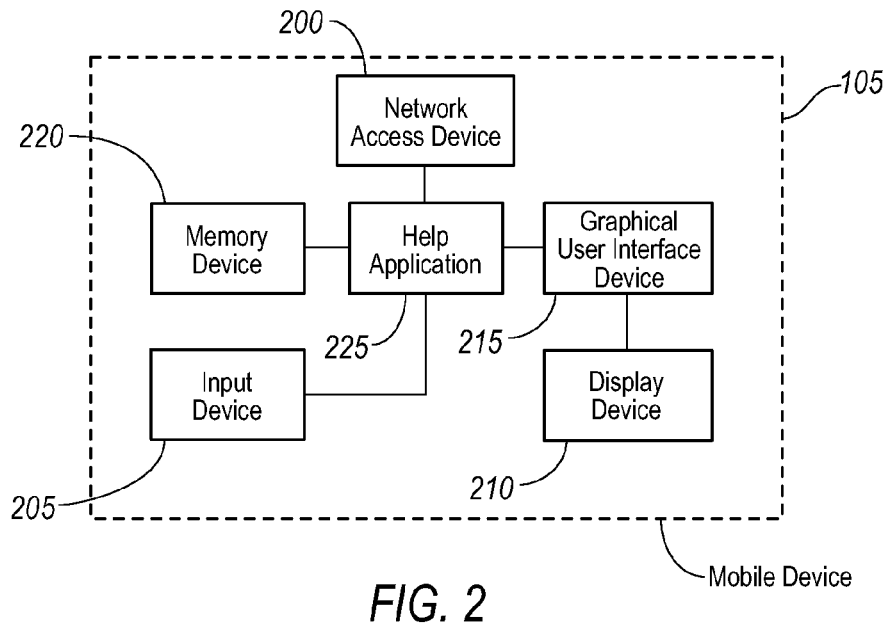
FIG. 2 is a block diagram of an example mobile device.

FIG. 2 is a block diagram of an example mobile device 105. As illustrated, the example mobile device 105 includes a network access device 200, an input device 205, a display device 210, a graphical user interface module 215, a memory device 220, and a help application 225.

The network access device 200 may include any device configured to allow the mobile device 105 to communicate over the communication network 120, which may include providing the appropriate hardware, software, or any combination thereof that allows the mobile device 105 to transmit signals to and receive signals from other devices in the system 100 over the communication network 120. The network access device 200 may include a wireless adapter configured to allow the mobile device 105 to connect to, e.g., a packet-switched or telecommunications network. Moreover, the network access device 200 may be configured to allow the mobile device 105 to tether to another mobile device 105 or a computer. Therefore, the network access device 200 may include a universal serial bus (USB) or other type of connector.

The input device 205 may include any device configured to allow a user to interface with the mobile device 105 by, for instance, receiving inputs from a user and transmitting signals representing the user inputs to other components of the mobile device 105. The input device 205 may be integrated into the mobile device 105, a separate device in wireless communication with the mobile device 105, or removably connected to the mobile device 105. The input device 205 may be in infrared or Bluetooth® communication with a corresponding receiver (not shown) in the mobile device 105. Alternatively, the input device 205 may connect to the mobile device 105 using, e.g., a universal serial bus (USB) connector. Possible input devices 205 include a keyboard, a mouse, a track pad, a touch screen, a remote control, etc.

The display device 210 may include any device configured to present data, media content, or both, to a user. The display device 210 may include a screen or monitor such as a liquid crystal display (LCD) screen, a plasma screen, a light emitting diode (LED) display screen, or the like. The display device 210 may be integrated into the mobile device 105, and in addition or in the alternative, the display device 210 may include a connector, such as a USB connector, a high definition multimedia interface (HDMI) connector, a digital visual interface (DVI) connector, etc., that allows the mobile device 105 to connect to an external screen. If the display device 210 includes such a connector, the display device 210 may output signals to the external screen so that data or media content may be displayed to the user.

The graphical user interface module 215 may include any combination of hardware and software configured to generate a graphical user interface (see, e.g., FIG. 3) that may be displayed to the user. The graphical user interface module 215 may receive data or media content from one or more applications and generate a graphical user interface that incorporates the data or media content in a way that allows the user to consume or interact with the presented data or media content. The generated graphical user interface may include prompts, selectable options, text input fields, etc., for the user to interface with the data or media content displayed. The way that the data is arranged on the graphical user interface may be controlled by one or more applications. For instance, the graphical user interface module 215 may be configured to receive instructions from an application that detail how the data should be presented to the user.

The memory device 220 may include any device configured to store data that may be used by one or more applications of the mobile device 105. In one possible approach, the memory device 220 may store the device information described above. The memory device 220 may be configured to allow one or more applications or components of the mobile device 105 to access and update stored data.

The help application 225 may include hardware, software, or any combination thereof that is configured to present information to the user that may answer the user's questions about features of the mobile device 105. The help application 225 may be configured to access the data stored in the memory device 220 and use the network access device 200 to transmit information to and receive information from other devices connected to the communication network 120.

In addition to the memory device 220 and network access device 200, the help application 225 may also be in communication with the input device 205, the display device 210, and the graphical user interface module 215. For example, the help application 225 may be configured to detect a predetermined user input provided by the user to the input device 205. The predetermined user input may indicate that the user has a question about how to operate the mobile device 105. Accordingly, the predetermined user input may be the telephone number to call the customer service call center 115. When the user dials this number using the mobile device 105, and in particular the input device 205, the user has indicated that he or she has a question about the mobile device 105. In response to detecting this predetermined user input, the help application 225 may be configured to access the device information from the memory device 220, perform a diagnostic test, and transmit the device information and the results of the diagnostic test to the remote server 110 over the communication network 120 using, e.g., the network access device 200. The help application 225 may be further configured to query the remote server 110 for a list of solutions and a performance rank, which may indicate how often a solution solves a particular type of problem or answers a particular type of question, associated with each solution. Since the query may include the device information, the list of solutions may be specific to the mobile device 105 as defined by the device information. In response to the query, the mobile device 105 may receive a list of solutions (see FIG. 3) associated with the device information from the remote server 110.

As mentioned above, each solution may be associated with a performance rank applied by the remote server 110. The help application 225 may be configured to populate the graphical user interface with the list of solutions by, for example, transmitting the list of solutions to the graphical user interface module 215 with instructions that include the order in which the solutions should be displayed to the user. The instructions may be based at least in part on the performance rank received from the remote server 110. As discussed above, solutions and corresponding performance rank provided by the remote server 110 may be limited to a predetermined time period (e.g., week, month, year, all-time, etc.). That is, only statistical data that falls within the predetermined time period may be used to generate the list of solutions and the performance rank associated with each solution.

It is possible that the help application 225 may be configured to generate the graphical user interface without using a separate graphical user interface module 215. In this alternative approach, the help application 225 may be configured to directly populate the graphical user interface with the list of solutions according to the performance rank and output the populated graphical user interface to the display device 210 for presentation to the user.

The remote server 110 may not always be available to transmit the list of solutions and associated performance rank to the mobile device 105. For instance, the mobile device 105 may be at a location where it is unable to communicate over the communication network 120. In such instances, the mobile device 105 may be configured to access a previously stored list of selectable solutions and associated performance rank from, e.g., the memory device 220 if it is determined that the remote server 110 is not available.

The help application 225 may be configured to populate the graphical user interface so that the most popular solutions or the solutions most likely to solve the problem experienced are presented first to a user. The help application 225 may be configured to identify which solution has the highest performance rank and instruct the graphical user interface module 215 to generate the graphical user interface with that solution in a position that the user is likely to see first. The help application 225 may further identify which solution has the lowest performance rank and instruct the graphical user interface to place that solution at a location where it can be viewed by the user if the higher performance solutions are not relevant to the user's question. The help application 225 may be further configured to populate the graphical user interface with other solutions that have intermediate performance ranks in descending order between the solutions with the highest and lowest performance ranks One example of such a graphical user interface is described below with respect to FIG. 3.

The help application 225 may be configured to receive a user selection of at least one of the solutions. In response, the help application 225 may be configured to present additional information associated with the selected solution to the user via, e.g., the graphical user interface. The help application 225 may be configured to directly or indirectly (e.g., via the graphical user interface module 215) update the graphical user interface to present any combination of text, pictures, or video to the user with the answer to the user's question or instructions for solving a problem encountered by the user.

Alternatively, the help application 225 may be configured to communicate with a computing device (not shown), such as a desktop computer or laptop, tethered to the mobile device 105. The mobile device 105 may connect to the computing device and the computing device may, using its own help application, communicate with the remote server 110 to receive the list of solutions for the mobile device 105. In this example approach, the help application of the computing device may be configured to access and transmit the device information from the memory device 220 of the tethered mobile device 105 to the remote server 110. The computing device may receive the list of solutions from the remote server 110 and present the list of solutions to the user. The user may select the solution and view the text, pictures, or video associated with the solution on the computing device so that the mobile device 105 is available for the user to make any modifications as described in the information associated with the selected solution.

The help application 225 may be further configured to transmit data to the remote server 110 so that the remote server 110 can generate and update the performance rank. Upon receipt of a user selection of a solution, the help application 225 may be configured to identify the selected solution to the remote server 110 and the remote server 110 may be configured to update the performance rank for that solution accordingly. Additionally or in the alternative, the help application 225 may identify only the successful solution (e.g., the solution that answered the user's question or solved the problem) to the remote server 110. By continually updating the performance rank of each solution in the list of solutions, the remote server 110 may always transmit a list of the most relevant or successful solutions for the particular mobile device 105 that presented the query. As discussed above, the remote server 110 may further consider other statistical data such as the number of questions received from customers about a particular feature at the service provider call center 115 so that information may be reflected in the performance rank.

Figure 3:
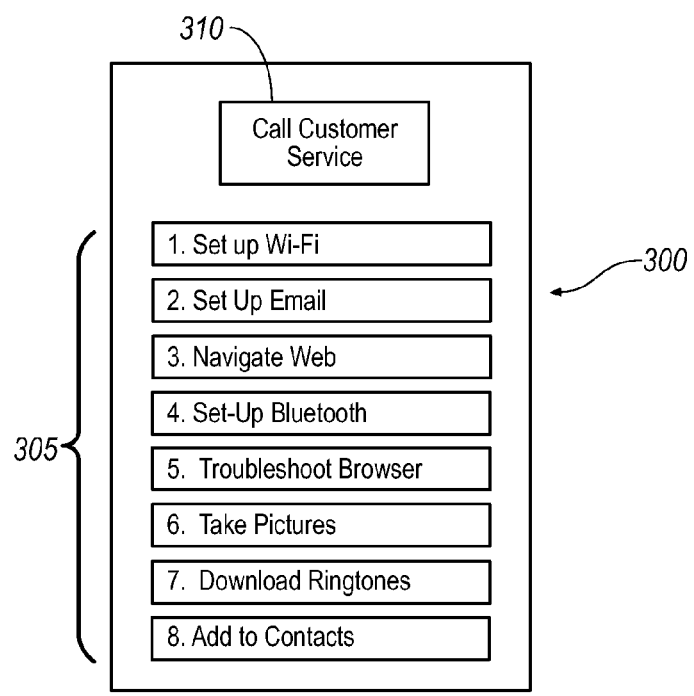
FIG. 3 illustrates an example graphical user interface that may be presented by one of the mobile devices.

FIG. 3 illustrates an example graphical user interface 300 that may be presented to the user after the user enters, e.g., the predetermined input. As discussed above, the help application 225 may intercept the predetermined input and populate, either directly or indirectly, the graphical user interface 300 with the list of solutions 305 received from the remote server 110 in accordance with the performance rank of each solution. Each solution presented may be a selectable button that provides specific information to the user if selected, as discussed.

In the example illustrated, the most popular question asked by users of that particular mobile device 105 is related to setting up the mobile device 105 to communicate over a Wi-Fi network. The least popular question is directed to adding contacts to an address book application of the mobile device 105. Therefore, as presented in the example of FIG. 3, the help application 225 has populated the graphical user interface 300 to include the most popular solution—namely, the "Set Up Wi-Fi" solution—to be at the top of the list of solutions 305 and the least popular solution—namely the "Add to Contacts" solution—to be at the bottom of the list of solutions 305. The other solutions are presented in descending order of popularity between the most and least popular solutions. Specifically in the FIG. 3 example, the "Set Up Email" solution is the next-highest solution in terms of popularity for the mobile device 105 so that solution is presented second on the list. Instructions for downloading ringtones, e.g., the "Download Ringtones" solution, is the second-least popular solution so it is second from the bottom on the list.

The popularity of the least popular solution may be relative. Specifically, the remote server 110 or the help application 225 may be configured to filter the list of solutions 305 so that only the most popular solutions for that particular mobile device 105 as defined by the device information are presented to the user. So although 8 solutions are presented in the example graphical user interface 300 of FIG. 3, other solutions that have a lower performance rank than the "Add to Contacts" solution either may not be transmitted to the mobile device 105 or may not be displayed in the graphical user interface 300. In addition, the graphical user interface 300 may present additional solutions that may be viewed if, for instance, the user navigates to another page or scrolls to view the additional solutions.

The graphical user interface 300 may further provide an option for the user to call the service provider call center 115 if, for instance, the user does not see the appropriate solution. As discussed above, the help application 225 may present the graphical user interface 300 in response to detecting a predetermined user input that, e.g., indicates that the user has a question about how to use a feature of the mobile device 105. If the user's question cannot be solved with one of the most popular solutions presented or if the user prefers to speak with a customer service representative, the user may press the "Call Customer Service" button 310. When the "Call Customer Service" button 310 is selected, the mobile device 105 may attempt to establish a call between the mobile device 105 and the customer service call center 115 so that the user may speak with a customer service representative and resolve the user's question. In addition or as an alternative, the graphical user interface may present a "Contact Customer Service" button (not shown) that may give the user the option of calling or sending an electronic message to the service provider call center 115.

Figure 4:
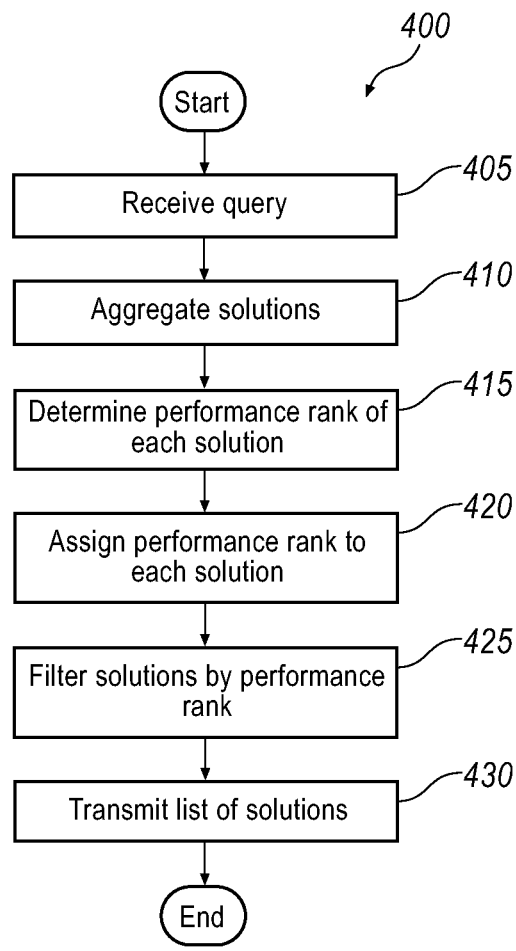
FIG. 4 is a flowchart of an example method that may be implemented by the remote server.

FIG. 4 is a flowchart of an example process 400 that may be implemented by the remote server 110.

At block 405, the remote server 110 may receive a query from the mobile device 105. The mobile device 105 may generate the query using the help application 225 and transmit the query over the communication network 120 using the network access device 200. The remote server 110 may receive the query via the communication network 120. The query received by the remote server 110 may include the device information that identifies a characteristic of the mobile device 105 that sent the query.

At block 410, the remote server 110 may aggregate a list of solutions based at least in part on the device information. That is, the remote server 110 may identify which solutions are relevant to the type of mobile device 105 as identified by the device information. As discussed above, the device information may include a model name or model number of the mobile device 105, an operating system version or kernel version used by the mobile device 105, or another type of identification such as a Mobile Equipment Identifier, an Electronic Serial Number, or an International Mobile Equipment Identifier. If, therefore, the device information indicates that the mobile device 105 is a particular cell phone running a particular operating system version, the remote server 110 may, at block 410, aggregate solutions that pertain to the same model cell phones that use the identified operating system version.

At block 415, the remote server 110 may determine the popularity or successfulness of each solution aggregated into the list of solutions at block 410. In one possible approach, the remote server 110 may access the popularity or successfulness of each of the solutions from a database. The remote server 110 may count the number of user requests associated with each solution for the mobile device 105 as defined by the device information and store that count in the database. In addition, the database may store the number of times that particular solution was successful. Therefore, the performance rank of each solution may be based at least in part on the number of times a user calls to ask a question about a particular feature of the mobile device 105 or the number of times other users have selected each solution from the list of solutions in addition to the number of times the solution answered the user's question or solved the user's problem. Also, using the device information, the remote server 110 may be configured to determine the performance rank of each solution in view of the specific characteristic of the mobile device 105 identified in the device information. The performance rank assigned to each solution may be further based at least in part on a time frame, such as a range of dates. This way, the remote server 110 may determine the popularity of each solution within a specific period of time (e.g., the last week, month, year, or all-time).

At block 420, the remote server 110 may assign to each solution the performance rank determined at block 415. The remote server 110 may therefore rank each solution based on the count stored in the database, as discussed above. Moreover, because the popularity determined at block 415 considers the device information, the performance rank for each solution is also based on the device information. That is, while users of different types of mobile devices 105 may have the same questions, the popularity of those questions may differ among users of different types of mobile devices 105. As such, there may be some overlap in the list of solutions aggregated at block 410, but the performance rank of those solutions (e.g., the order in which those solutions are ultimately presented to users) may be different according to the different mobile devices 105 as identified by the device information.

At block 425, the remote server 110 may filter the list of solutions. In one possible implementation, the remote server 110 may remove solutions that have a performance rank below a predetermined threshold so that the list of solutions only includes those solutions with a performance rank above the predetermined threshold. This way, only the most popular solutions for the mobile device 105 as defined by the device information may be transmitted to the mobile device 105.

At block 430, the remote server 110 may transmit, over the communication network 120, the list of solutions and the performance rank associated with each solution to the mobile device 105 that sent the query. The remote server 110 may, in one example, only transmit the solutions that have the performance rank that is above the predetermined threshold, discussed above with respect to block 425.

Figure 5:
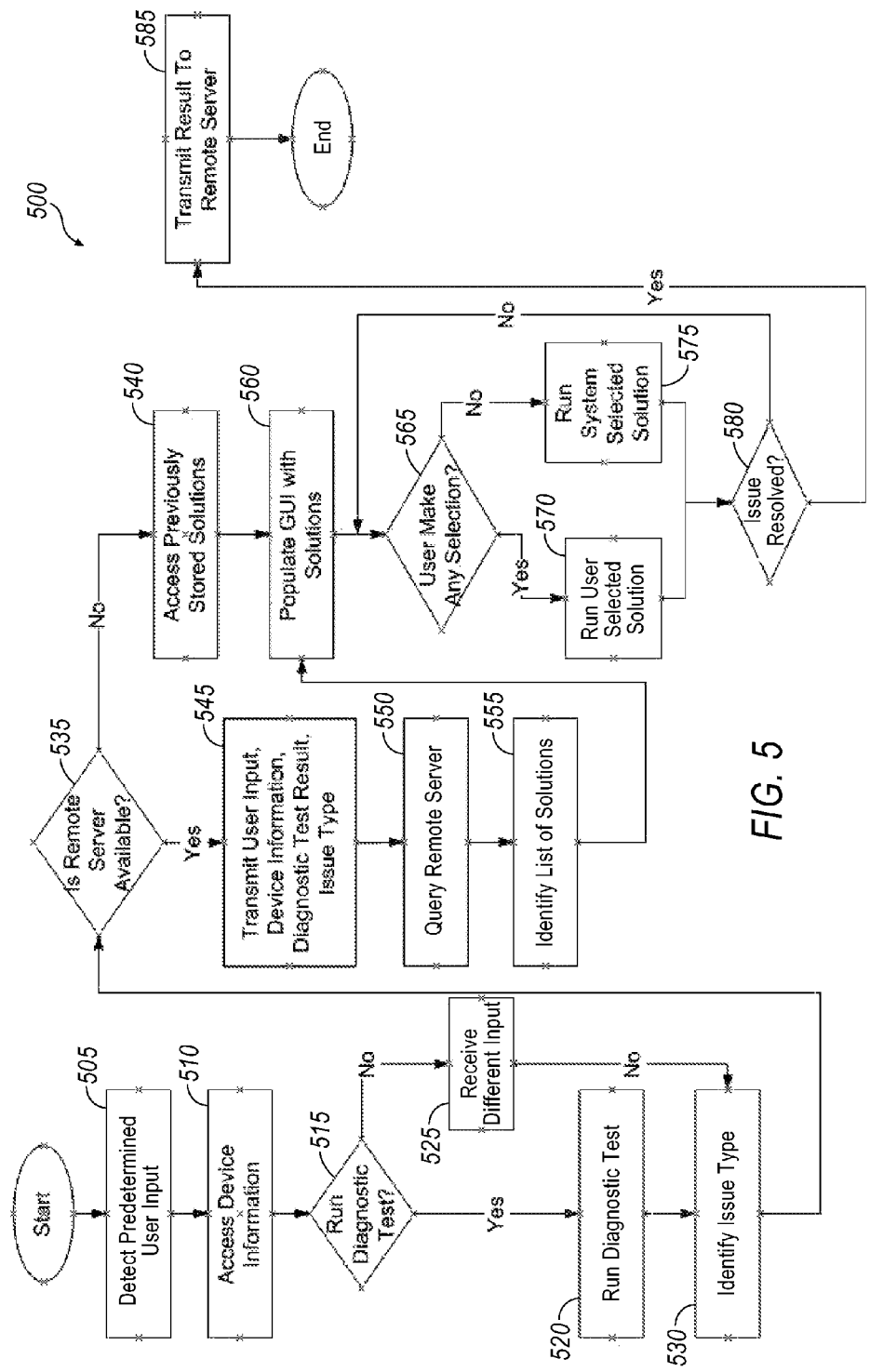
FIG. 5 is a flowchart of an example method that may be implemented by the mobile device.

FIG. 5 illustrates a flowchart of an example process 500 that may be implemented by the mobile device 105, and in particular, the help application 225.

At block 505, the help application 225 may detect the predetermined user input. The user may provide the predetermined user input to the mobile device 105 using the input device 205, and the input device 205 may allow the user to interface with the mobile device 105. The predetermined user input may indicate that the user has a question about a particular feature of the mobile device 105. For example, the predetermined user input may be a telephone number to the service provider call center 115 that the user may enter using the input device 205.

At block 510, the help application 225 may access the device information stored in, e.g., the memory device 220. As discussed above, the device information may identify a characteristic of the mobile device 105. The device information may include a model name, a model number, an operating system version, a kernel version, a Mobile Equipment Identifier, an Electronic Serial Number, or an International Mobile Equipment Identifier, etc.

At decision block 515, the help application 225 may prompt the user to run a diagnostic test. The user may elect to run the diagnostic test, which may result in the help application 225 generating diagnostic information. The diagnostic information may indicate to the remote server 110 the nature of the problem experienced by the user (e.g., the issue type). If the user elects to run the diagnostic test, the process 500 may continue at block 520. If not, the process 500 may continue at block 525

At block 520, the help application 225 may perform the diagnostic test to generate the diagnostic information. The diagnostic test may, in one possible approach, include identifying whether various hardware and software components of the mobile device 105 are operating properly. Moreover, the diagnostic test may determine which features of the mobile device 105 have been enabled or disabled. The output of the diagnostic test may be the diagnostic information.

At block 525, the help application 225 may receive an input from the user. The input at block 525 may include a question or a description of the problem experienced with the mobile device 105.

At block 530, the help application 225 may identify an issue type based on the diagnostic information determined at block 520 or the user input from block 525. The issue type may be used, as discussed below, by the remote server 110 or the help application 225 to filter solutions to the type of issue experienced by the user.

At decision block 535, the help application 225 may determine whether the remote server 110 is available for communication over the communication network 120. The help application 225 may, using the network access device 200, ping the remote server 110 or otherwise attempt to establish communication with the remote server 110. If no response is received within a predetermined amount of time, the help application 225 may conclude that the remote server 110 is unavailable and continue the process 500 at block 540. If, however, the help application 225 determines that the remote server 110 is available, the method 500 may continue at block 545.

At block 540, the help application 225 may access a previously stored list of solutions and associated performance rank of each solution from the memory device 220. Thus, even if the mobile device 105 is unable to establish communication with the remote server 110, the help application 225 may be able to present some helpful information to the user. The process 500 may then continue at block 560.

At block 545, the help application 225 may transmit the device information, the user input from block 525, the diagnostic information from block 520, the issue type identified at block 530, etc., to the remote server 110 over, for instance, the communication network 120. The help application 225 may address the device information to the remote server 110, and using the network access device 200, the device information may be transmitted to the remote server 110. In response, the remote server 110 may generate a new list of solutions and performance ranks for each solution particular to the mobile device 105.

At block 550, the help application 225 may query the remote server 110. That is, the help application 225 may request or retrieve the list of solutions stored in one or more databases of the remote server 110 in accordance with the performance ranks. In one possible implementation, the query at block 550 may be transmitted with the device information. Alternatively, the query and device information may be transmitted in two or more communications between the mobile device 105 and the remote server 110.

At block 555, the help application 225 may receive the list of solutions from the remote server 110. As discussed above, the remote server 110 may generate the list of solutions in accordance with the performance rank of each solution. The help application 225 may receive each solution and the performance rank of each solution, or alternatively, the order in which the help application 225 receives each solution may identify the performance rank of each solution (e.g., the help application 225 may receive the solutions with the highest performance rank first and subsequently receive solutions with lower performance ranks).

At block 560, the help application 225 may populate the graphical user interface with the list of selectable solutions. That is, the help application 225 may output the list of solutions to the graphical user interface module 215 in accordance with the performance rank so that the graphical user interface may be populated accordingly. The help application 225 may identify which solution has the highest performance rank and lowest performance rank among the solutions received. The help application 225 may further populate the graphical user interface to include the solution with the highest performance rank at the location that the user is likely to see first (e.g., at the top of the list) and the lowest performance rank at the location the user is likely to see last (e.g., at the bottom of the list). The graphical user interface may be populated with solutions having intermediate performance ranks in descending popularity order between the solutions with the highest and lowest performance ranks. The help application 225 may further consider the issue type identified at block 530 when populating the graphical user interface. Moreover, as discussed above, the help application 225 may generate the graphical user interface directly, that is, without the use of the graphical user interface module 215.

At decision block 565, the help application 225 may prompt the user to select one of the solutions presented. Each solution presented in the graphical user interface may be selectable, and the help application 225 may receive a signal from the input device 205 that indicates which solution the user selected. In one possible approach, the user may be given the option to let the help application 225 select the most appropriate solution. If the user selects one of the solutions, the process 500 may continue at block 570. If, however, the user elects to have the help application 225 select the most appropriate solution, the process may continue at block 575. In one possible implementation, at block 565, the help application 225 may further present, via the graphical user interface, a selectable option for the user to contact, either via telephone or via electronic message, for example, a customer service representative at the service provider call center 115 to further discuss the user's question about the mobile device 105.

At block 570, the help application 225 may run the user-selected solution. That is, the help application 225 may automatically execute steps associated with the solution selected by the user, or alternatively, the help application 225 may present instructions to the user to manually resolve the issue. The help application 225 may present, via the graphical user interface, either directly or through the graphical user interface module 215, text, pictures, or video with information that is associated with the selected solution. The user may view the text, pictures, or video and determine whether it resolves the user's question or issue. If so, the user may follow any instructions presented. Once the user has completed following the presented instructions, the process 500 may continue at block 580.

At block 575, the help application 225 may select and run the most appropriate solution given the issue type, which as discussed above considers a question or description from the user or the diagnostic information.

At decision block 580, the help application may determine whether the solution tried at block 570 or block 575 was successful. That is, the help application 225 may prompt the user to determine whether the user is still experiencing the same issue. In addition or in the alternative, the help application 225 may run another diagnostic test to determine if the issue persists. If the issue persists, the process 500 may return to block 565 to allow the user or help application 225 to select another solution. If the issue was resolved, the process 500 may continue at block 585.

At block 585, the help application 225 may transmit a signal representing one or more of the selected solution to the remote server 110 so, for instance, the remote server 110 may dynamically update the performance rank of the solutions. When a solution is selected, the remote server 110 may increase the performance rank of that solution and decrease the performance rank of other solutions. In one possible approach, the help application 225 may transmit a signal representing all solutions whether selected by the user or the help application 225. Alternatively, the help application 225 may transmit a signal representing only successful solutions (e.g., solutions that resolved the issue) and the issue types associated with each successful solution.

CONCLUSION

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

The invention claimed is:

1. A device comprising:
    an input device configured to receive a plurality of user inputs including a predetermined user input representing a call request to a customer service call center;
    a display device configured to display a graphical user interface;
    a memory configured to store device information; and
    a help application in communication with the input device, the display device, and the memory, and wherein the help application is configured to detect the call request to the customer service call center and, in response to detecting the call request to the customer service call center, intercept the call request such that the call request is not transmitted from the device to the customer service call center, run a diagnostic test on the device to produce diagnostic test data and populate the graphical user interface with a selectable option to connect the device with the customer service call center and with a list of selectable solutions associated with the device information and the diagnostic test data in accordance with a performance rank associated with each solution without the call request being transmitted from the device to the call center, wherein the performance rank is based on the device information, and wherein the graphical user interface is populated with the list of selectable solutions received from a remote server in response to data transmitted from the device over a communication network where the data is a query including the device information and diagnostic test data and wherein one solution has a highest performance rank based on the device information and another solution has a lowest performance rank based on the device information, the help application being further configured to populate the graphical user interface with the solution having the highest performance rank above the solution having the lowest performance rank.

2. The device as set forth in claim 1, wherein the help application is configured to receive the list of selectable solutions and the performance rank associated with each solution from a remote server.

3. The device as set forth in claim 2, wherein the help application is configured to query the remote server for the list of selectable solutions and associated performance rank in response to receiving the call request to the customer service call center.

4. The device as set forth in claim 3, wherein the help application is configured to access a previously stored list of selectable solutions and performance rank from the memory device if the remote server is unavailable.

5. The device as set forth in claim 2, wherein the help application is configured to transmit the selected solution, whether it resolved issue and the device information to the remote server.

6. The device as set forth in claim 1, wherein the help application is configured to receive a user selection of at least one of the solutions and transmit the selected solution and the device information to a remote server.

7. The device as set forth in claim 6, wherein the help application is configured to present information associated with the selected solution via the graphical user interface.

8. The device as set forth in claim 7, wherein the information associated with the selected solution includes at least one of pictures and video.

9. The device as set forth in claim 1, wherein the graphical user interface is populated with the list of selectable solutions without a user having to speak with a customer service representative.

10. A method comprising:
    receiving, over a communication network at a remote server, data transmitted from a device where the data is a query, the query including device information about the device and diagnostic test data that was generated by the device in response to user input requesting a call to a customer service call center from the device, wherein the remote server receives the query from the device in response to the call to the customer service call center from the device being intercepted such that the call is not transmitted from the device to the call center;
    aggregating, via the remote server, a list of solutions based upon the device information and diagnostic test data;
    assigning to each solution a performance rank based at least in part on the device information received at the remote server; and
    transmitting, over the communication network, the list of solutions and the performance rank associated with each solution from the remote server to the device; wherein one solution has a highest performance rank based on the device information and another solution has a lowest performance rank based on the device information to enable the device to populate a graphical user interface with the solution having the highest performance rank above the solution having the lowest performance rank with a selectable option to connect the device with the customer service call center.

11. The method as set forth in claim 10, further comprising counting, at the remote server, a number of user requests for each solution to determine the performance rank of each solution.

12. The method as set forth in claim 11, wherein assigning the performance rank to each solution includes ranking each solution according to the number of customer requests for the solution.

13. The method as set forth in claim 10, further comprising filtering, via the remote server, the list of solutions to remove solutions that have a performance rank below a predetermined threshold from the list of solutions.

14. The method as set forth in claim 13, wherein transmitting the list of solutions includes transmitting, via the communication network, only those solutions that have a performance rank above the predetermined threshold to the device.

15. The method as set forth in claim 10, wherein the query further includes user input.

16. The method as set forth in claim 10, wherein the performance rank is assigned according to the number of times the solutions successfully resolved issue for a type of device.

17. A non-transitory computer readable medium tangibly embodying computer executable instructions comprising:
    detecting a predetermined user input representing a call request to a customer service call center;
    intercepting the call request such that the call request is not transmitted from a user device to the customer service call center;
    accessing device information identifying a characteristic of a device;
    transmitting data to a remote server where the data is a query that includes the device information and diagnostic test data that was generated by the user device in response to the predetermined user input without the call request being transmitted from the user device to the call center;
    receiving, from the remote server, a list of selectable solutions based at least in part on the device information and diagnostic test data and a performance rank of each solution, wherein the performance rank is based at least in part on the device information;
    identifying one solution of the solutions as having a highest performance rank for the device associated with the device information;
    identifying one solution of the solutions as having a lowest performance rank for the device associated with the device information; and
    populating a graphical user interface with a selectable option to connect the user device with the customer service call center and with the list of selectable solutions with the solution having the highest performance rank above the solution having the lowest performance rank.

18. The computer readable medium as set forth in claim 17, further comprising: determining whether the remote server is available to receive queries over the communication network; and
    accessing a previously stored list of selectable solutions and performance rank from a memory device if the remote server is unavailable.

19. The computer readable medium as set forth in claim 17, further comprising: receiving a user selection of at least one of the selectable solutions; and transmitting the selected solution and the device information to the remote server.

20. The computer readable medium as set forth in claim 17, wherein the query further includes user input.

* * * * *